(12) United States Patent
Moore

(10) Patent No.: US 9,848,521 B1
(45) Date of Patent: Dec. 26, 2017

(54) ROCK SIFTING AND REMOVING TRACTOR ATTACHMENT DEVICE

(71) Applicant: Dillon James Moore, Atesian, SD (US)

(72) Inventor: Dillon James Moore, Atesian, SD (US)

( * ) Notice: Subject to any disclaimer, the term of this patent is extended or adjusted under 35 U.S.C. 154(b) by 0 days.

(21) Appl. No.: 15/287,069

(22) Filed: Oct. 6, 2016

(51) Int. Cl.
*A01B 43/00* (2006.01)
*B07B 1/12* (2006.01)
*E02F 3/40* (2006.01)

(52) U.S. Cl.
CPC .............. *A01B 43/00* (2013.01); *B07B 1/12* (2013.01); *E02F 3/404* (2013.01)

(58) Field of Classification Search
CPC ... E02F 3/404; E02F 3/96; E02F 3/961; E02F 3/962; E02F 3/401; E02F 3/4133; A01B 43/00
See application file for complete search history.

(56) References Cited

U.S. PATENT DOCUMENTS

| | | | | |
|---|---|---|---|---|
| 2,262,415 | A * | 11/1941 | Williams | E02F 3/8155 |
| | | | | 172/777 |
| 3,034,237 | A * | 5/1962 | Wolfe | E02F 3/769 |
| | | | | 37/241 |
| 3,478,449 | A * | 11/1969 | Baker | E02F 3/401 |
| | | | | 172/719 |
| 3,567,050 | A * | 3/1971 | Pasquazzi | E02F 3/404 |
| | | | | 294/104 |
| 3,595,416 | A * | 7/1971 | Perrotti | E02F 3/401 |
| | | | | 37/405 |
| 3,603,007 | A * | 9/1971 | Naber | A01B 43/00 |
| | | | | 171/63 |
| 3,938,680 | A * | 2/1976 | Grimes | E02F 3/401 |
| | | | | 37/409 |
| 3,975,844 | A * | 8/1976 | Olson | E02F 3/404 |
| | | | | 37/405 |
| 4,125,952 | A * | 11/1978 | Jennings | A01D 87/0053 |
| | | | | 37/405 |
| 4,151,664 | A * | 5/1979 | Maura | E02F 3/962 |
| | | | | 299/67 |
| 4,241,525 | A * | 12/1980 | Mann | E02F 3/8155 |
| | | | | 172/748 |
| 4,886,124 | A | 12/1989 | Kleinhuizen | |
| 4,925,359 | A * | 5/1990 | Dunnegan | E02F 3/4075 |
| | | | | 414/704 |
| 4,928,410 | A * | 5/1990 | Walters | E02F 3/404 |
| | | | | 172/254 |
| 5,241,764 | A * | 9/1993 | Modig | E02F 3/407 |
| | | | | 37/405 |

(Continued)

FOREIGN PATENT DOCUMENTS

| | | | | |
|---|---|---|---|---|
| CN | | 1711397 | 12/2005 | |
| SE | WO 9505729 | A1 * | 3/1995 | ............. A01B 43/00 |

*Primary Examiner* — Jamie L McGowan

(57) ABSTRACT

A rock sifting and removing tractor attachment device for unearthing very large rocks and sifting large rocks from soil includes a connection frame configured for coupling to a vehicle. Each of a pair of fixed arms projects forward from a bottom of the connection frame. A sifting panel includes a plurality of interconnected spaced beams. The sifting panel is pivotable relative to the connection frame between a retracted position and an extended position. The beams are positioned parallel to the connection frame in the retracted position and the beams are positioned coplanar with the fixed arms in the extended position.

1 Claim, 6 Drawing Sheets

(56) References Cited

U.S. PATENT DOCUMENTS

| | | | | |
|---|---|---|---|---|
| 5,564,885 A | * | 10/1996 | Staben, Jr. | E02F 3/3631 37/403 |
| 5,664,348 A | | 9/1997 | Omann | |
| 6,092,606 A | | 7/2000 | Basler | |
| 6,098,320 A | | 8/2000 | Wass | |
| 6,146,081 A | * | 11/2000 | Anderson | B66F 9/12 37/405 |
| 6,182,385 B1 | * | 2/2001 | Knutson | E02F 3/404 172/197 |
| 6,209,236 B1 | * | 4/2001 | Omann | A01B 43/00 37/405 |
| 6,267,547 B1 | * | 7/2001 | Lund | B66F 9/18 294/68.1 |
| 6,308,440 B1 | | 10/2001 | Mueller | |
| 6,357,993 B1 | * | 3/2002 | Burton | E02F 3/34 37/406 |
| 6,408,551 B1 | * | 6/2002 | Pettersson | B07B 1/12 37/409 |
| 6,526,678 B2 | * | 3/2003 | Waddington, Jr. | E02F 3/404 172/811 |
| 6,718,662 B1 | | 4/2004 | Schaff | |
| 7,066,275 B1 | * | 6/2006 | Keigley | A01B 43/00 171/111 |
| 7,354,239 B2 | * | 4/2008 | Deyo | E02F 3/404 37/406 |
| 7,726,052 B2 | | 6/2010 | Zettel | |
| 7,913,431 B1 | * | 3/2011 | Beam | A01G 23/06 37/406 |
| 8,069,591 B2 | * | 12/2011 | Dunn | A01D 87/0076 37/406 |
| 8,745,903 B1 | * | 6/2014 | Ritter | A01B 43/00 37/303 |
| 9,133,599 B2 | | 9/2015 | Henning et al. | |
| 9,185,855 B2 | * | 11/2015 | Humphrey | A01G 23/06 |
| 9,506,215 B2 | * | 11/2016 | Krell | E02F 3/404 |
| 2004/0040724 A1 | | 3/2004 | Stevens | |
| 2015/0042116 A1 | * | 2/2015 | Jacobson | A01D 87/127 294/197 |
| 2015/0176241 A1 | * | 6/2015 | Krell | E02F 9/2816 37/444 |

\* cited by examiner

ROCK SIFTING AND REMOVING TRACTOR ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tractor attachment devices and more particularly pertains to a new tractor attachment device for unearthing very large rocks and sifting large rocks from soil.

BRIEF SUMMARY OF THE INVENTION

An embodiment of the disclosure meets the needs presented above by generally comprising a connection frame configured for coupling to a vehicle. Each of a pair of fixed arms projects forward from a bottom of the connection frame. A sifting panel includes a plurality of interconnected spaced beams. The sifting panel is pivotable relative to the connection frame between a retracted position and an extended position. The beams are positioned parallel to the connection frame in the retracted position and the beams are positioned coplanar with the fixed arms in the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
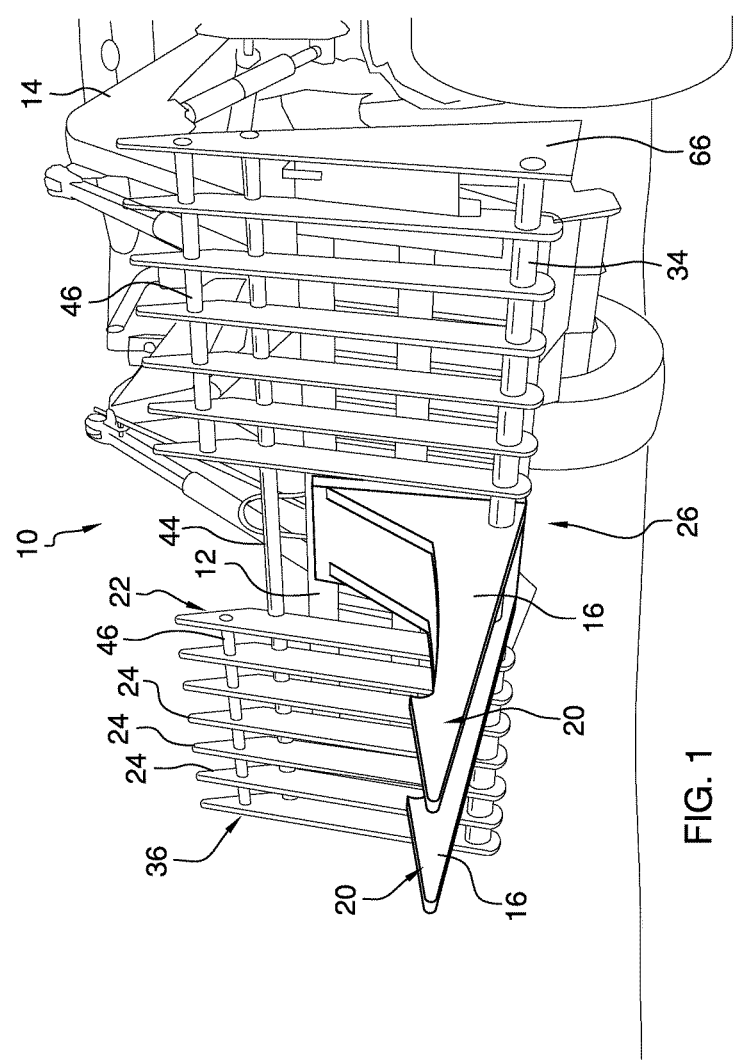
FIG. 1 is a top front side perspective view of a rock sifting and removing tractor attachment device according to an embodiment of the disclosure.
Figure 2:
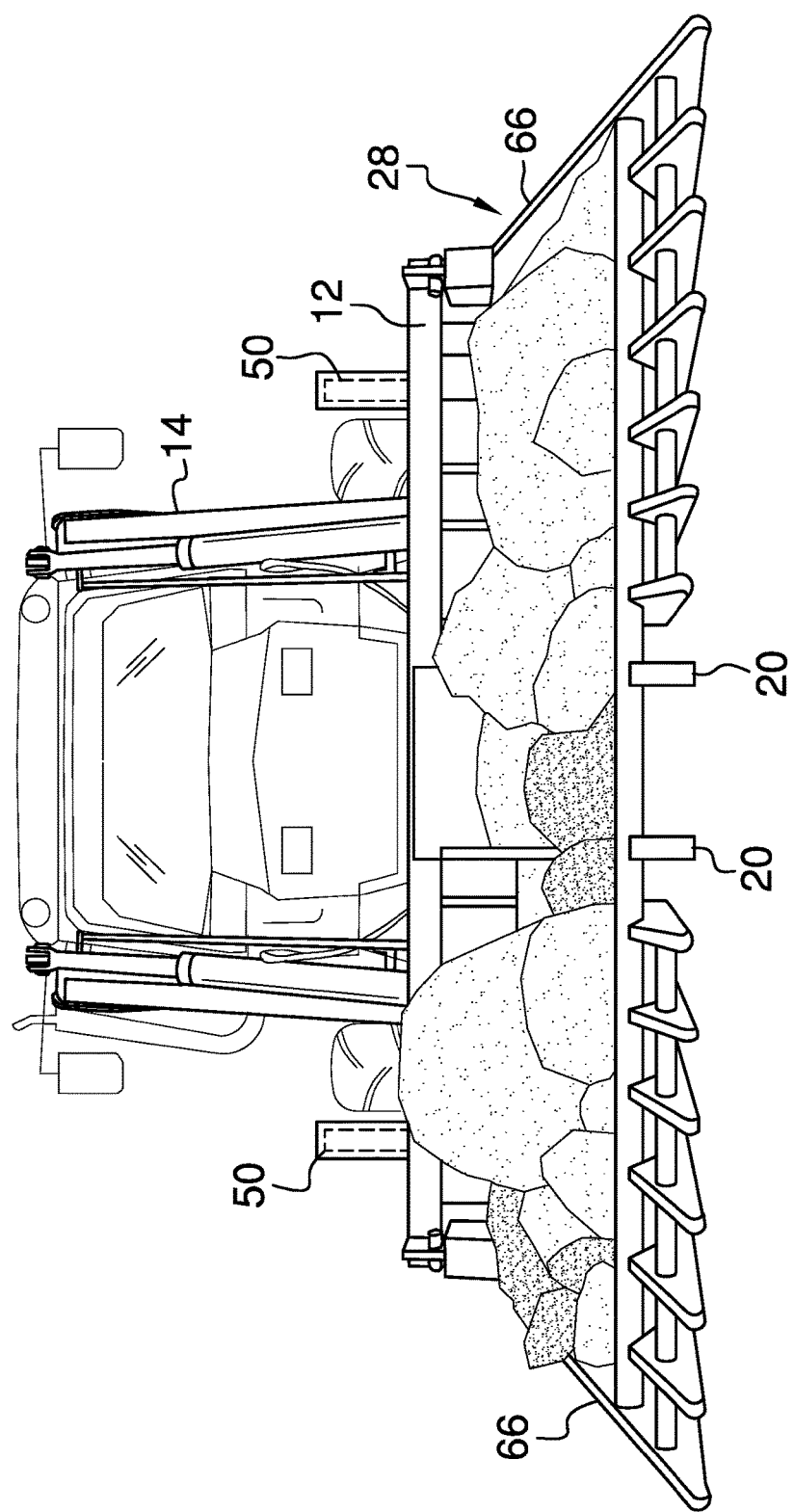
FIG. 2 is a front view of an embodiment of the disclosure in use for sifting rocks.
Figure 3:
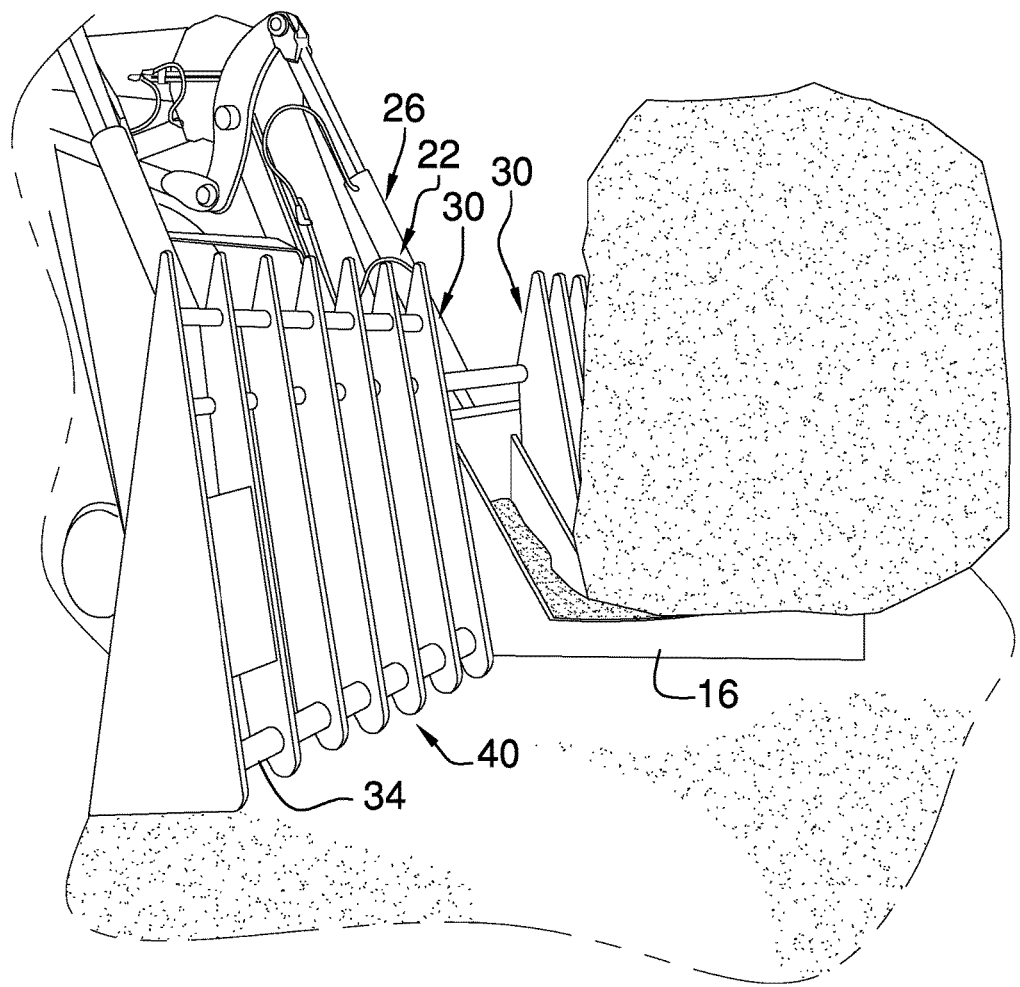
FIG. 3 is a side view of an embodiment of the disclosure in use to move a large rock.
Figure 4:
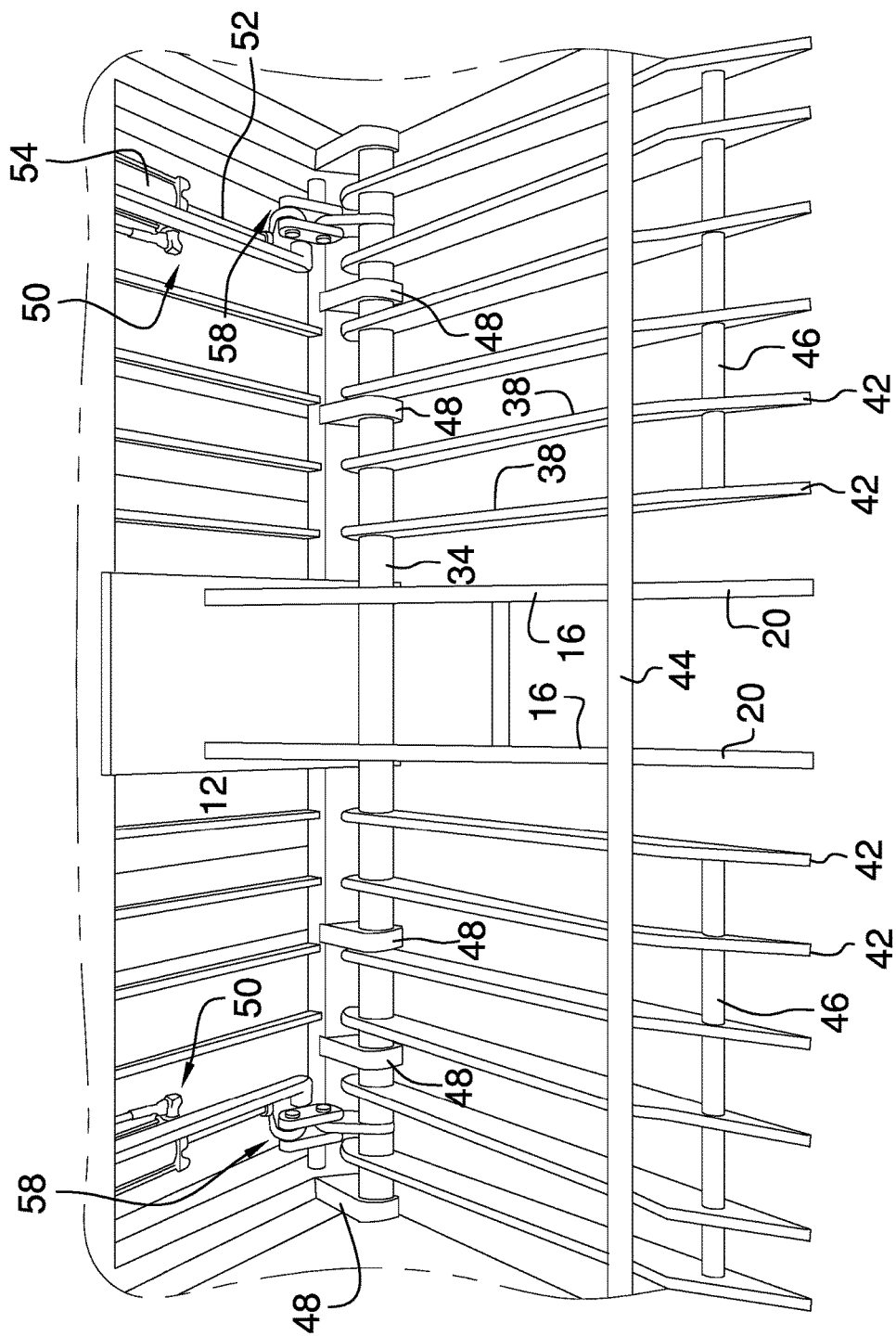
FIG. 4 is a top front perspective view of an embodiment of the disclosure.
Figure 5:
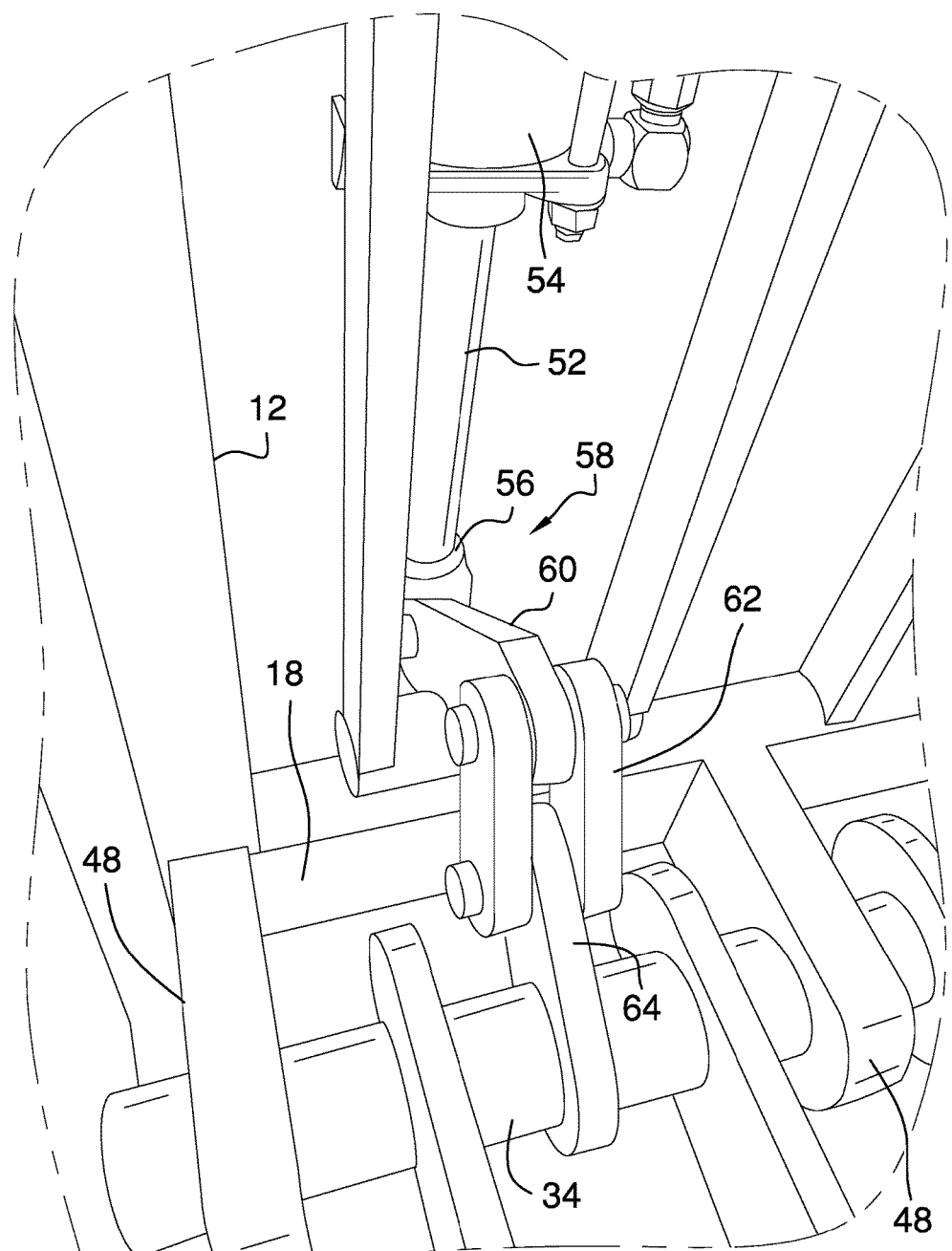
FIG. 5 is a detailed top front side perspective view of a linkage of an embodiment of the disclosure.
Figure 6:
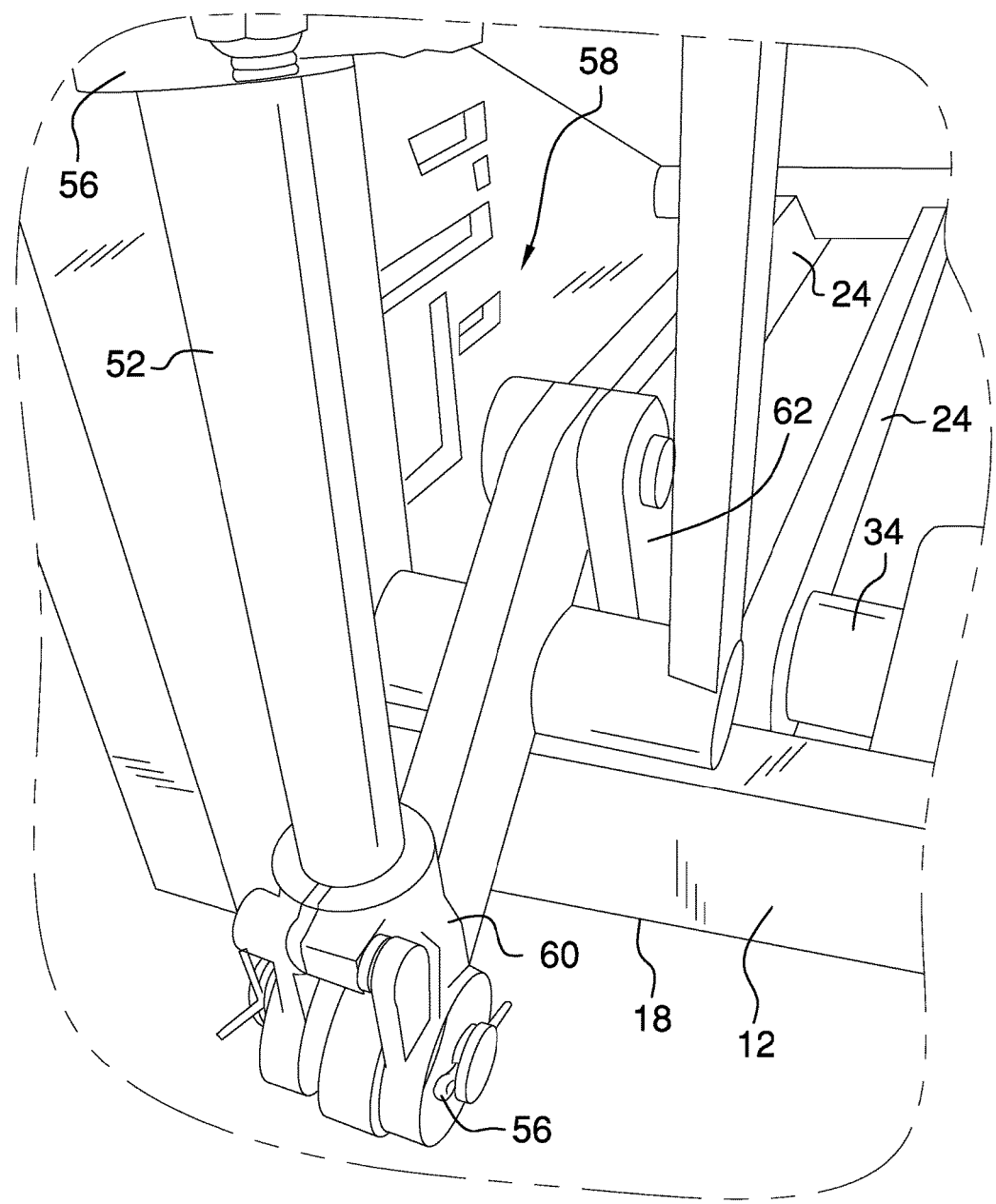
FIG. 6 is a detailed top rear side perspective view of a linkage of an embodiment of the disclosure.

With reference now to the drawings, and in particular to FIGS. 1 through 6 thereof, a new tractor attachment device embodying the principles and concepts of an embodiment of the disclosure and generally designated by the reference numeral 10 will be described.

As best illustrated in FIGS. 1 through 6, the rock sifting and removing tractor attachment device 10 generally comprises a connection frame 12 configured for coupling to a vehicle 14 such as a tractor or the like. Each of a pair of fixed arms 16 projects forward from a bottom 18 of the connection frame 12. Each of the fixed arms 16 has a barbed distal end 20 relative to the connection frame 12. A sifting panel 22 includes a plurality of interconnected spaced sifting panel beams 24. The sifting panel 22 is pivotable relative to the connection frame 12. The sifting panel 22 is pivotable between a retracted position 26 and an extended position 28. The sifting panel beams 24 are positioned parallel to the connection frame 12 in the retracted position 26 and the sifting panel beams 24 are positioned coplanar with the fixed arms 16 in the extended position 28. The sifting panel 22 has a pair of outer sections 30. Each of the outer sections 30 is positioned on a respective side of the fixed arms 16. Each of the sifting panel beams 24 is coupled to and extends from a base pivot beam 34. Each of a plurality of braces 48 is coupled to and extends forwardly from the connection frame 12. The base pivot beam 34 extends through the each of the braces 48 and the fixed arms 16. The base pivot beam 34 extends through the fixed arms 16 at an end opposite the barbed distal ends 20 of the fixed arms 16. The sifting panel beams 24 pivot about the base pivot beam 34. Rams 50 are coupled to the connection frame 12. Each ram 50 has a housing 54 and piston 52. The piston 52 extends and retracts parallel to the connection frame 12. A distal end 56 of each piston 52 relative to the housing 54 is coupled to a linkage 58. The linkage 58 includes a first pivotable section 60 which is coupled to and pivots relative to the connection frame 12. The linkage 58 includes a second section 62 extending between and pivotally coupled to each of the first section 60 and a flange 64 which extends from and is in a fixed position relative to the sifting panel 22. The linkage 58 urges the flange 64 to pivot about the base pivot beam 34 when the piston 52 is extended and retracted. Thus, the rams 50 are used to move the sifting panel 22 between the retracted position 26 and the extended position 28. The rams 50 may be hydraulic and tied into a hydraulic system of the vehicle 14 in a conventional manner.

The sifting panel beams 24 are coplanar and parallel with each other. Each of the sifting panel beams 24 has a straight bottom surface 36 and a top surface 38 of each sifting panel beam 24 is angled relative to the bottom surface 36 of the sifting panel beam 24. Thus, the sifting panel beams 24 taper extending away from a back end 40 of the sifting panel beam 24 and towards a pointed end 42 of the sifting panel beam 24. A main support beam 44 extends a full length across the sifting panel 22. Each of a pair of outer support beams 46 extends across a full length of an associated one of the outer sections 30 of the sifting panel 22. The sifting panel 22 is moved between the extended position 28 and the retracted position 26 in a conventional manner such as the use of hydraulic pistons, or the like, controlled remotely from within the vehicle 14 and powered using a system tied into the vehicle 14.

Outer plates 66 are coupled to opposite ends of the sifting panel 22. The outer plates 66 are positioned laterally spaced outward from the connection frame 12 such that the connection frame 12 is positioned extending between the outer plates 66 when the sifting panel 22 is in the retracted position 26. The outer plates 66 are right triangular shaped, coextensive with the beams, and taper extending away from the connection frame 12 when the sifting panel 22 is in the extended position 28.

In use, the sifting panel 22 is placed into the retracted position 26 for loosening and removal of large rocks using only the fixed arms 16. The sifting panel 22 is placed into the extended position 28 allowing the spaced beams 24 to sift rocks and debris out of soil.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rock removing and sifting tractor attachment device comprising:

a connection frame, said connection frame being configured for coupling to a vehicle;

a pair of fixed arms, said fixed arms projection forward from a bottom of said connection frame, each of said fixed arms having a barbed distal end relative to said connection frame;

a sifting panel, said sifting panel comprising a plurality of sifting panel beams being interconnected and spaced apart from each other, said sifting panel being pivotable relative to said connection frame, said sifting panel being pivotable between a retracted position and an extended position, said sifting panel beams being positioned parallel to said connection frame in said retracted position, said sifting panel beams being positioned coplanar with said fixed arms in said extended position, said sifting panel having a pair of outer sections and an open section therebetween, said fixed arms being aligned with said open section and each of said outer sections being positioned on a respective side of said fixed arms, each of said sifting panel beams being coupled to and extending from a base pivot beam, said base pivot beam extending through said fixed arms, said beams pivoting about said base pivot beam, said sifting panel beams being coplanar and parallel, each of said beams having a straight bottom surface, a top surface of each said sifting panel beam being angled relative to said bottom surface of said sifting panel beam wherein each said sifting panel beam tapers extending away from a back end of said sifting panel beam and towards a pointed end of said sifting panel beam;

a main support beam extending a full length across said sifting panel;

a pair of outer support beams, each of said outer support beams extending across a full length of an associated one of said outer sections of said sifting panel.

* * * * *